(12) United States Patent
Pazhyannur et al.

(10) Patent No.: US 11,240,130 B2
(45) Date of Patent: Feb. 1, 2022

(54) TRIGGERING PACKET CAPTURE BASED ON DETECTING A SEQUENCE ANOMALY

(71) Applicant: Cisco Technology, Inc., San Jose, CA (US)

(72) Inventors: Rajesh S. Pazhyannur, Fremont, CA (US); Manoj Gupta, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 175 days.

(21) Appl. No.: 16/219,559

(22) Filed: Dec. 13, 2018

(65) Prior Publication Data

US 2020/0195533 A1    Jun. 18, 2020

(51) Int. Cl.
*H04L 12/26* (2006.01)
*H04L 29/06* (2006.01)
*H04L 29/12* (2006.01)

(52) U.S. Cl.
CPC ............ *H04L 43/062* (2013.01); *H04L 43/04* (2013.01); *H04L 43/16* (2013.01); *H04L 61/2015* (2013.01); *H04L 63/0876* (2013.01)

(58) Field of Classification Search
CPC ....... H04L 43/062; H04L 43/04; H04L 43/16; H04L 61/2015; H04L 63/0876
See application file for complete search history.

(56) References Cited

U.S. PATENT DOCUMENTS

| | | | |
|---|---|---|---|
| 7,363,656 B2* | 4/2008 | Weber | H04L 63/1425 709/223 |
| 9,210,181 B1 | 12/2015 | Nandy et al. | |
| 9,450,978 B2 | 9/2016 | Vasseur et al. | |
| 9,503,467 B2 | 11/2016 | Lefebvre et al. | |
| 9,930,057 B2 | 3/2018 | Di Pietro et al. | |
| 10,523,702 B2* | 12/2019 | Pivetta | H04L 63/1483 |
| 10,965,562 B2* | 3/2021 | Mermoud | H04L 43/08 |

(Continued)

FOREIGN PATENT DOCUMENTS

WO    2016164050 A1    10/2016

OTHER PUBLICATIONS

Borisov et al., "Hidden Markov Model Approach to TCP Link State Tracking," 43rd IEEE Conference on Decision and Control, 2004, pp. 1-6.

(Continued)

*Primary Examiner* — Philip J Chea
*Assistant Examiner* — Robert B McAdams
(74) *Attorney, Agent, or Firm* — Merchant & Gould P.C.

(57) ABSTRACT

In one embodiment, a method is performed. A device comprising a non-transitory memory and a processor coupled to the non-transitory memory may be in communication with a plurality of network devices. The device may detect an anomaly in a detected sequence of events occurring during a connectivity process for establishing a connection between a first network device and a second network device of the plurality of network devices. The anomaly may comprise a difference between the detected sequence of events and a predetermined sequence of events. The device may determine whether the anomaly satisfies a criterion for triggering a packet capture operation. If so, the device may cause at least one of the first network device or the second network device to capture at least one target packet.

20 Claims, 4 Drawing Sheets

(56) References Cited

U.S. PATENT DOCUMENTS

| | | | |
|---|---|---|---|
| 2004/0205374 A1* | 10/2004 | Poletto | H04L 63/1425 714/4.2 |
| 2005/0144237 A1* | 6/2005 | Heredia | H04L 51/38 709/206 |
| 2016/0219065 A1* | 7/2016 | Dasgupta | H04L 63/1425 |
| 2019/0190938 A1* | 6/2019 | Oba | H04L 63/1416 |

OTHER PUBLICATIONS

Munz et al., "TCP Traffic Classification Using Markov Models," 2010, pp. 1-14.

Salamatian et al., "Hidden Markov Modeling for network communication channels," 2001 ACM SIGMETRICS, 2001, pp. 92-101.

Wei et al., "Continuous-time hidden Markov models for network performance evaluation," Performance Evaluation 49, 2002, pp. 129-146.

Whalen et al., "Hidden Markov Models for Automated Protocol Learning," SecureComm 2010, LNICST 50, 2010, pp. 415-428.

* cited by examiner

TRIGGERING PACKET CAPTURE BASED ON DETECTING A SEQUENCE ANOMALY

TECHNICAL FIELD

The present disclosure generally relates to wireless networking.

BACKGROUND

During the process of establishing a connection between a client device, such as a user equipment (UE) device, and an access point (AP) device, it may be desirable to monitor the process of establishing the connection. This may be accomplished by capturing packets. Capturing packets all the time and/or at all stages of the connection process, however, may consume considerable computational and/or network resources. Packet capture may be performed when a problem is detected, but this approach may provide information too late to affect a remedial response.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for capturing packets in response to detecting an anomaly in a sequence of events in a connection establishment process. This approach may exploit a priori knowledge of a sequence of events that should occur when a device, such as a user equipment (UE) device, is connecting to an access point (AP) device. If there is sufficient deviation from this sequence of events, it can be inferred that a problem may exist. Packet capture may be triggered.

In an embodiment, a device comprising a non-transitory memory and a processor coupled to the non-transitory memory may be in communication with a plurality of network devices. The device may detect an anomaly in a detected sequence of events occurring during a connectivity process for establishing a connection between a first network device and a second network device of the plurality of network devices. The anomaly may comprise a difference between the detected sequence of events and a predetermined sequence of events. The device may determine whether the anomaly satisfies a criterion for triggering a packet capture operation. If so, the device may cause at least one of the first network device or the second network device to capture at least one target packet.

Example Embodiments

Figure 1:
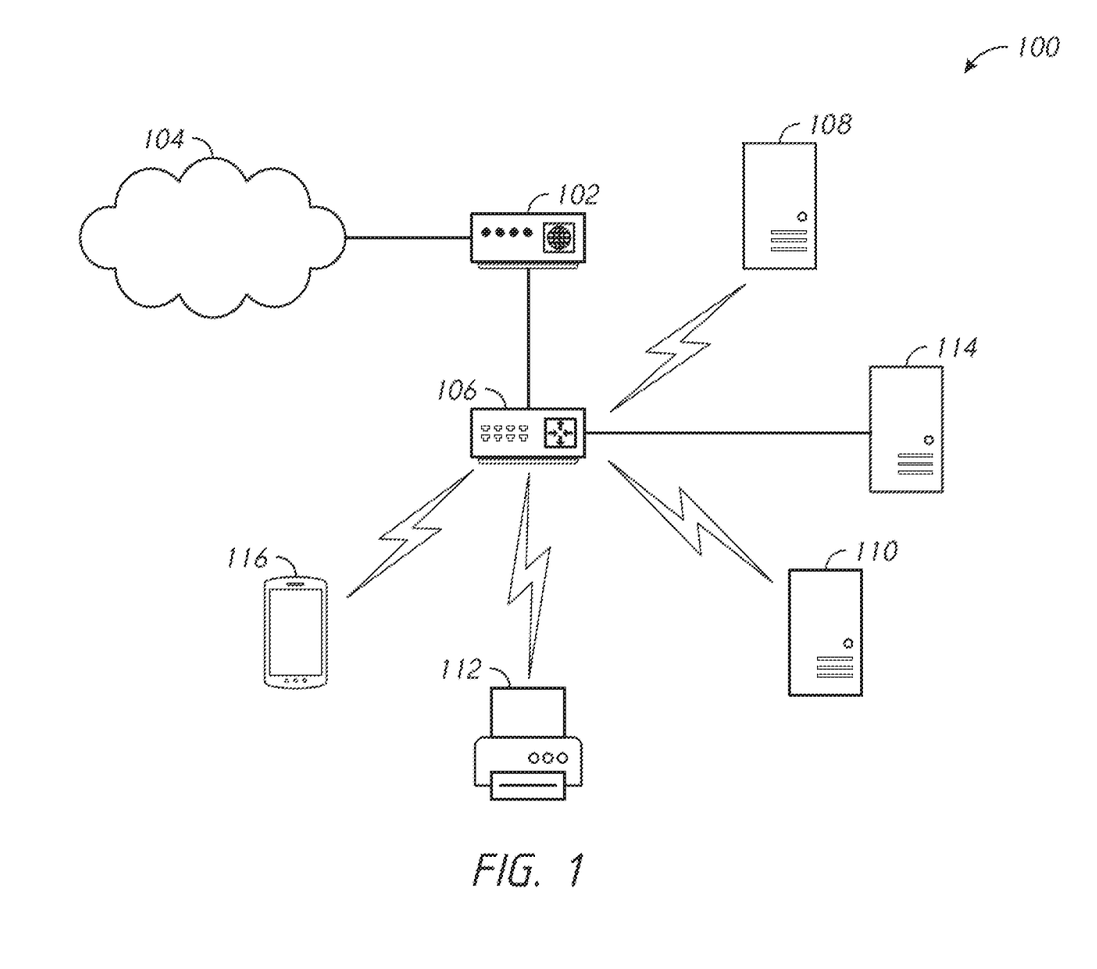
FIG. 1 is a diagram that illustrates an example network.

FIG. 1 illustrates an example network 100. The network 100 may be implemented using any of a variety of communication specifications, including, for example, the Institute of Electrical and Electronics Engineers (IEEE) 802.11 specifications, also known as WiFi.

The network 100 may include a cable modem 102 that may have a wired connection with an external network 104, such as the internet. The cable modem 102 may have a wired connection with a router 106. In this way, the router 106 may be in communication with the external network 104.

The router 106 may use radio signals to transmit data to and receive data from devices connected to the network 100. The radio signals may be transmitted at frequencies of, for example, 2.4 GHz or 5 GHz.

A variety of devices may be connected to the network 100. These devices may include, for example, computers 108 and 110 and/or a printer 112, which may communicate with the router 106 using radio signals. Other devices, such as a computer 114, may communicate with the router 106 using a wired connection.

Some devices, such as a user equipment (UE) device 116 (e.g., a mobile telephone) may be in communication with both the router 106 and with another network, such as a long-term evolution (LTE) network.

It will be appreciated that the network 100 may include more or fewer devices than are depicted in FIG. 1.

A network may use packet capture functionality to determine the nature of problems that may arise in the network. For example, a network device may capture packets that are received by or sent from the network device. However, the network may capture packets inefficiently. For example, the network may capture packets that may not be pertinent to determining the nature of a problem. Accordingly, a device that captures packets inefficiently may use excessive memory and/or processing resources. It may be impractical to have a packet capture process constantly running in view of the demand on resources.

As an example, packet capture functionality may be used to monitor the process of establishing a connection between a client device, such as a user equipment (UE) device, and an access point (AP) device. Packets related to the connectivity process may be captured. Capturing packets all the time and/or at all stages of the connection process, however, may be inefficient as it may consume considerable computational and/or network resources. Packet capture may be performed when a problem is detected, but this approach may be ineffective as it may provide information too late to affect a remedial response.

Figure 2:
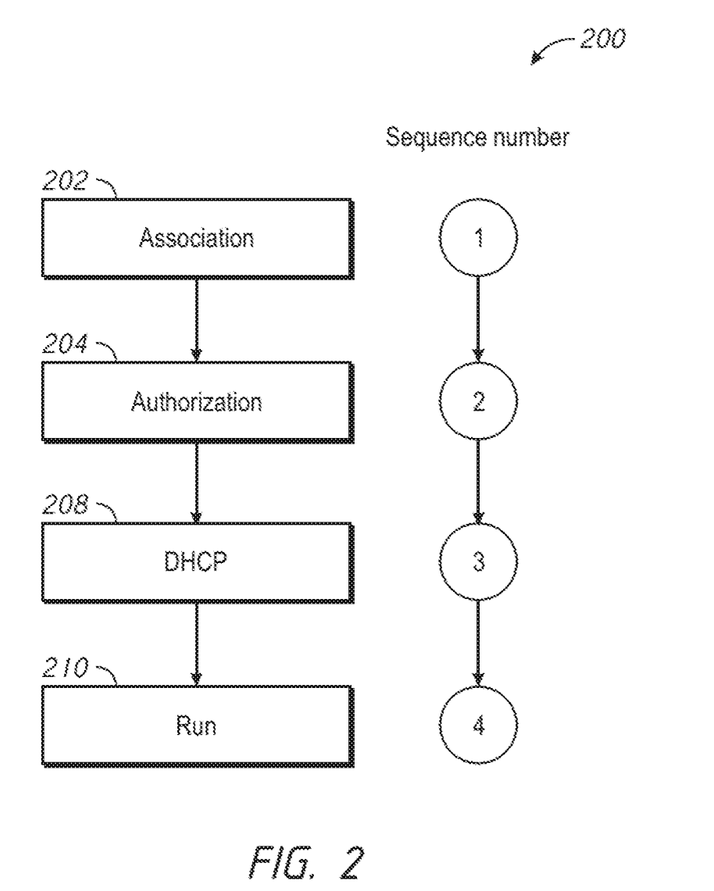
FIG. 2 is a diagram that illustrates an example sequence of connectivity events.

In some embodiments, a network, e.g., a device connected to a network, may have a priori knowledge of a sequence of events that are expected to occur in a successful process of establishing a connection between a device, such as a UE device, and an AP device. FIG. 2 illustrates an example sequence 200 of events, e.g., connectivity events, that may be expected to occur when a connection is established between a UE device and an AP device.

During an association event 202, the UE device may decide with which AP device to associate. The UE device may authenticate to the selected AP device. After the UE device has authenticated to the selected AP device, the UE device may enter into an authenticated but not associated state. The UE device may then send an association request to the selected AP device. The association request may include one or more chosen encryption types (e.g., if required) and other compatible capabilities.

If certain elements of the association request match the capabilities of the AP device, the AP device may create an association ID for the UE device. The AP device may send the UE device an association response. The association response may include a success message that grants network access to the UE device. The UE device may enter an authenticated and associated state.

During an authentication event 204, a server may verify the identity of the UE device.

During a dynamic host configuration protocol (DHCP) event 208, the UE device may request (e.g., broadcast a request for) an internet protocol (IP) address. A DHCP server may reply with an IP address and/or other network configuration parameters.

During a run event 210, the connection may be established between the UE device and the AP device. The UE device may be able to transmit and receive traffic to and from the AP device.

As shown in FIG. 2, each of the connectivity events disclosed herein may be associated with a sequence number, e.g., a positive integer. For example, the association event 202 may be associated with the sequence number 1. The authentication event 204 may be associated with the sequence number 2. The DHCP event 208 may be associated with the sequence number 3. The running event 210 may be associated with the sequence number 4.

In a successful connection establishment process, the events may be expected to occur in a specific sequence, e.g., {1, 2, 3, 4}. This sequence may be known as a sequence vector. Because the sequence of events of a successful connection process may be known apriori, a packet capture operation may be initiated or triggered on a condition that a criterion is satisfied. This criterion may be that the actual (e.g., detected) sequence of events indicates a probability of connection failure that exceeds a threshold. For example, a controller may generate an indication of the events as they occur in real time, e.g., the controller may indicate that association events occurred at times T1, T2, and/or T4. In some embodiments, the controller may trigger or initiate a packet capture if these generated intermediate event indicators suggest a likely failure. For example, the sequence {1, 2, 3, 4} may indicate success in an ideal situation. By contrast, the sequence {1, 2, 2} (e.g., indicating an association event followed by two authorization events) may indicate a likelihood of failure that may exceed the threshold. As another example, the sequence {1, 2, 2, 3, 4} may indicate a likelihood of success, e.g., even though two authorization events were detected. In some embodiments, the controller may trigger or initiate a packet capture operation if the number of consecutive authentication events exceeds a threshold. The controller may trigger or initiate a packet capture operation if the time between an authentication event and a DHCP event exceeds a time duration threshold.

In some embodiments, the controller may trigger or initiate a packet capture operation on a condition that a detected sequence of events is consistent with a probable future connectivity issue, e.g., before the connectivity issue actually occurs. Triggering the packet capture operation before the connectivity issue occurs may enable the network, e.g., the controller, to take proactive remedial steps to account for or avoid the connectivity issue.

Figure 3:
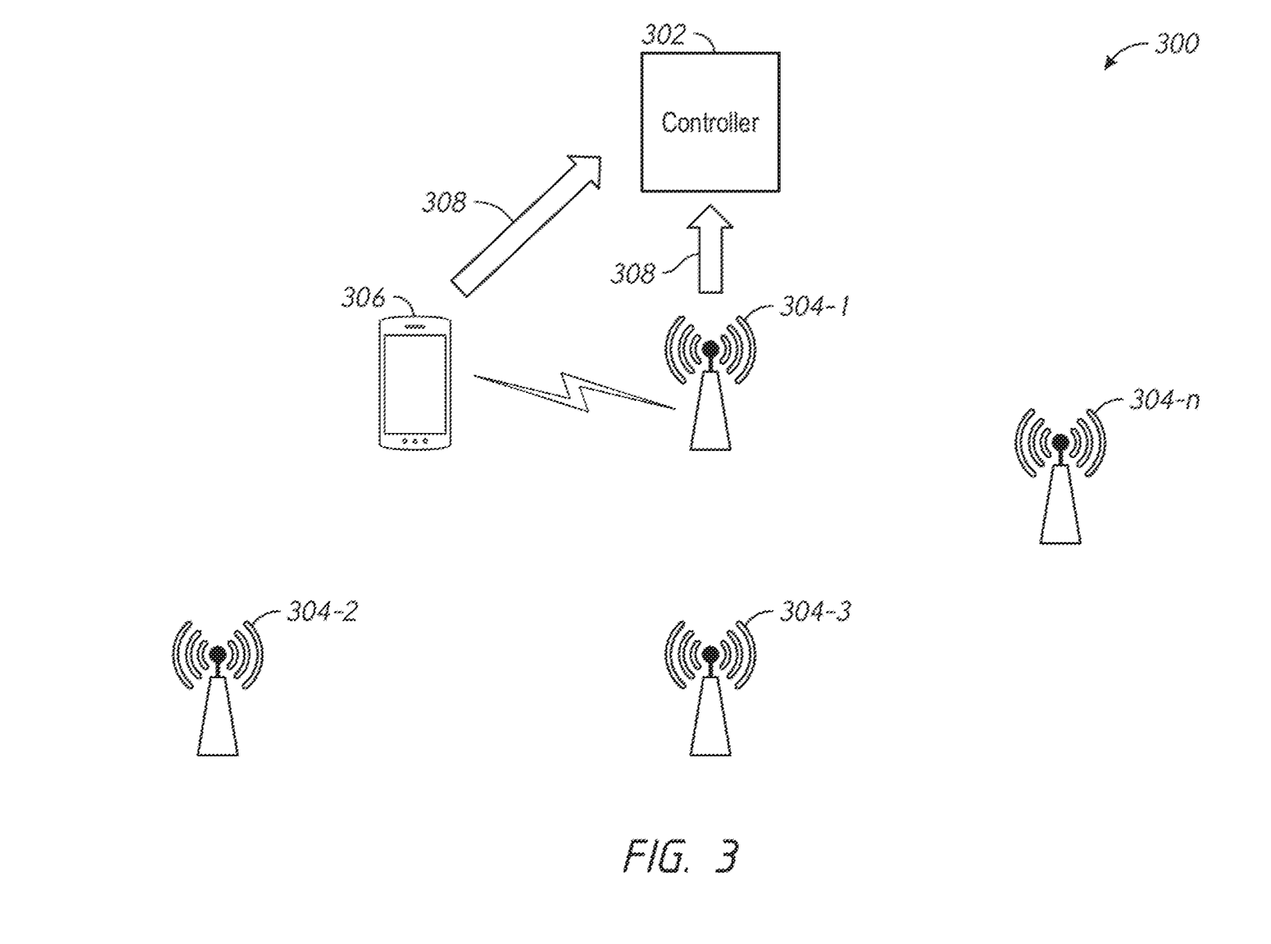
FIG. 3 is a diagram that illustrates an example network.

FIG. 3 illustrates an example network 300. The network 300 may include a controller 302, e.g., a central controller.

The controller 302 may be in communication with other devices in the network 300, including, for example, one or more wireless access point (AP) devices 304-1, 304-2, . . . , 304-n (collectively referred to as AP devices 304). The controller 302 may be incorporated in the same device as one of the AP devices 304. In some embodiments, the controller 302 may be distinct from the AP devices 304. For example, the controller 302 may be implemented as an assurance system that may be implemented as a centralized entity.

In some embodiments, a client device, such as a user equipment (UE) device 306, may attempt to connect to one of the AP devices 304, e.g., the AP device 304-1. The UE device 306 may attempt to connect to the AP device 304-1 using a connectivity process. The controller 302 may have information or access to information regarding a predetermined sequence of events that may be expected to occur during the connectivity process. The predetermined sequence of events may include events that occur during a successful connection procedure. This expected sequence of events may be consistent with the sequence illustrated in FIG. 2, for example. The predetermined sequence may be programmed into the controller 302.

The controller 302 may detect an anomaly in a sequence of events that occurs (e.g., is observed to occur) during the connectivity process. The anomaly may be or may include a difference or deviation between the sequence of events that occurs during the connectivity process and the predetermined sequence of events that may be expected to occur during the connectivity process.

If the controller 302 determines that there is an anomaly in the sequence of events, the controller 302 may determine whether the difference between the sequence of events that occurs during the connectivity process and the predetermined sequence of events that may be expected to occur during the connectivity process satisfies a criterion. The criterion may be satisfied, for example, if the probability that a given sequence of events (e.g., the detected sequence of events) may result in or be associated with a future connectivity issue meets or exceeds a threshold. The threshold may be a future problem confidence threshold, e.g., a threshold probability. For example, in the example sequence illustrated in FIG. 2, the sequence {1, 2, 2} may exceed the threshold, such that, if this sequence is detected, the probability that a problem will occur in the future exceeds a threshold. By contrast, the sequence {1, 2, 3, 4, 5} may not exceed the threshold.

In some embodiments, if the controller 302 determines that the criterion is satisfied, the controller 302 may trigger or initiate a packet capture process. One or more packets associated with the connectivity process between the UE device 306 and the AP device 304-1 may be captured. In some embodiments, the controller 302 may take further corrective action based on the captured packets. For example, the controller 302 may affect the connectivity process between the UE device 306 and the AP device 304-1.

The controller 302 may instruct the AP device 304-1 and/or the UE device 306 to capture and send target packets 308 to the controller 302. The target packets 308 may include packets sent by and/or received by one or more of the AP device 304-1 and/or the UE device 306. The controller 302 may store the target packets 308 in a memory. The AP device 304-1 and/or the UE device 306 may store packets to be captured in a buffer (e.g., buffer the packets to be captured). When capturing the packets, the controller 302 and/or one or more of the AP device 304-1 and/or the UE device 306 may retrieve at least one packet from the buffer.

In some embodiments, the criterion for triggering a packet capture operation may be satisfied if more than a threshold number of repeated events of a particular type occur consecutively. For example, the controller 302 may determine that the criterion is satisfied if three or more consecutive association events occur.

In some embodiments, the controller 302 may determine whether a detected sequence of connectivity events indicates at least a threshold probability of failure (e.g., a future problem confidence threshold). The controller 302 may make this determination, for example, based on whether the detected sequence conforms to at least one of a plurality of acceptable template sequences for the ongoing connectivity process. One acceptable sequence may be an ideal sequence, e.g., {1, 2, 3, 4}. Another acceptable sequence may be, for example, {1, 2, 2, 3, 4}. Other acceptable sequences may be specified and/or programmed in the controller 302. In some embodiments, the controller 302 may make the determination based on the degree to which the detected sequence conforms to at least one of the plurality of acceptable sequences. For example, the controller 302 may make the determination based at least in part on clustering sequence patterns.

In some embodiments, the controller 302 may determine whether the detected sequence of connectivity events indicates at least a threshold probability of failure by determining whether a count of occurrences of a connectivity event type exceeds a threshold count of occurrences for that connectivity event type. For example, if the controller 302 detects a sequence {1, 2, 2, 2, 2, 3, 4}, the controller 302 may determine that the number (e.g., 4) of authorization events (e.g., corresponding to type 2) exceeds a threshold count, e.g., three. The controller 302 may make this determination for one or more connectivity event types. For example, the controller 302 may make this determination for each connectivity event type in the sequence of connectivity events.

In some embodiments, the controller 302 may determine whether the detected sequence of connectivity events indicates at least a threshold probability of failure by determining whether a time value (e.g., a duration) associated with a connectivity event exceeds a threshold time value (e.g., a threshold duration) for the connectivity event type. The controller 302 may make this determination for one or more connectivity event types. For example, the controller 302 may make this determination for each connectivity event type in the sequence of connectivity events.

In some embodiments, the controller 302 may determine whether the detected sequence of connectivity events indicates at least a threshold probability of failure by determining whether a cumulative time value (e.g., a cumulative duration) associated with the sequence of connectivity events in the connectivity process exceeds a threshold cumulative time value (e.g., a threshold cumulative duration) for the connectivity process.

In some embodiments, data that identifies properties of the connectivity process may include time stamp information. The time stamp information may indicate a time at which the data was generated. The controller 302 may receive and use the time stamp information in evaluating whether an anomaly satisfies the criterion for triggering a packet capture operation.

Figure 4:
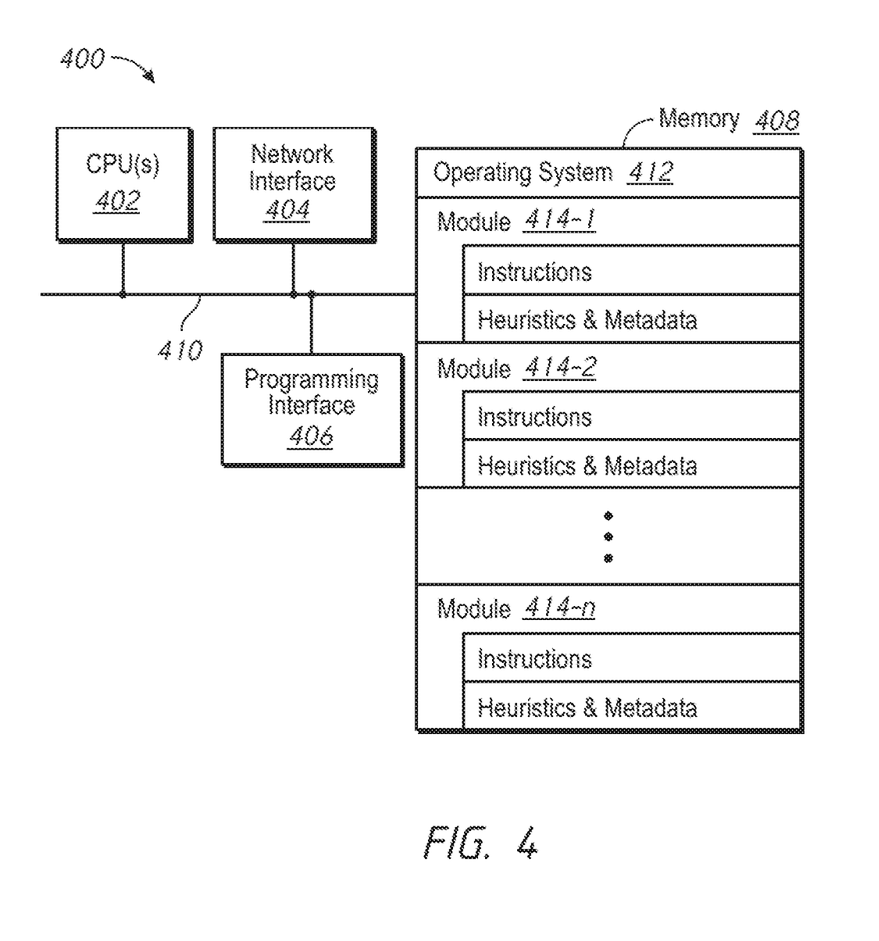
FIG. 4 is a block diagram that illustrates an example server system.

FIG. 4 is a block diagram of an example server system 400 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 400 may include one or more processing units (CPUs) 402, a network interface 404, a programming interface 406, a memory 408, and one or more communication buses 410 for interconnecting these and various other components.

The network interface 404 may be provided to, among other uses, establish and/or maintain a metadata tunnel between a cloud-hosted network management system and at least one private network including one or more compliant devices. In some embodiments, the one or more communication buses 410 may include circuitry that interconnects and controls communications between system components. The memory 408 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 408 may include one or more storage devices remotely located from the one or more CPUs 402. The memory 408 may comprise a non-transitory computer readable storage medium.

In some embodiments, the memory 408 or the non-transitory computer readable storage medium of the memory 408 may include (e.g., store) the following programs, modules, and data structures, or a subset thereof including one or more of an operating system 412 or various modules 414-1, 414-2, . . . , 414-$n$. The modules 414-1, 414-2, . . . , 414-$n$, individually and/or collectively, perform one or more of the operations described herein. To that end, in various embodiments, the modules 414-1, 414-2, . . . , 414-$n$ may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc., may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   detecting an anomaly in a detected sequence of events occurring during a connectivity process for establishing a connection between a first network device and a second network device of a plurality of network devices, wherein each successive event expected to occur in a specific sequence during the connectivity process is assigned a successive sequence number comprising a positive integer, and wherein determining the anomaly comprises:
      determining a set of positive integers assigned to the detected sequence of events occurring during the connectivity process, and
      determining a difference between the set of positive integers assigned to the detected sequence of events and an expected set of positive integers assigned to a predetermined sequence of events expected to occur during the connectivity process;
   determining that the anomaly satisfies a criterion for triggering a packet capture operation, wherein the criterion comprises a probability that the detected sequence of events will result in a future connectivity issue exceeding a threshold; and
   in response to determining that the anomaly satisfies the criterion for triggering the packet capture operation, causing at least one of the first network device or the second network device to capture at least one target packet.

2. The method of claim 1, further comprising taking a remedial action affecting the connectivity process based on the at least one target packet.

3. The method of claim 1, wherein at least one event in the detected sequence of events comprises at least one of an association event, an authorization event, a mobility event, a dynamic host configuration protocol (DHCP) event, or a running event.

4. The method of claim 1, wherein determining that the anomaly satisfies the criterion for triggering the packet capture operation comprises determining that the detected sequence of events conforms to at least one acceptable template sequence of a plurality of acceptable template sequences.

5. The method of claim 1, wherein the anomaly satisfies the criterion for triggering the packet capture operation if the detected sequence of events comprises a number of events of a same type that exceeds the threshold.

6. The method of claim 1, wherein the anomaly satisfies the criterion for triggering the packet capture operation if the detected sequence of events comprises at least one event exceeding a threshold duration.

7. The method of claim 1, wherein the anomaly satisfies the criterion for triggering the packet capture operation if the detected sequence of events exceeds a threshold cumulative duration.

8. The method of claim 1, wherein determining that the anomaly satisfies the criterion for triggering the packet capture operation comprises receiving time stamp information.

9. A device comprising:
   a network interface in communication with a network;
   a processor configured to execute computer readable instructions included on a non-transitory memory; and
   a non-transitory memory including processor-readable instructions that, when executed by the processor, cause the device to
      detect an anomaly in a detected sequence of events occurring during a connectivity process for establishing a connection between a first network device and a second network device of the plurality of network devices, wherein each successive event expected to occur in a specific sequence during the connectivity process is assigned a successive sequence number comprising a positive integer, and wherein the instructions causing the device to determine the anomaly comprises the instructions causing the device to:
         determine a set of positive integers assigned to the detected sequence of events occurring during the connectivity process, and
         determine a difference between the set of positive integers assigned to the detected sequence of events and an expected set of positive integers assigned to a predetermined sequence of events;
      determine that the anomaly satisfies a criterion for triggering a packet capture operation, wherein the criterion comprises a probability that the detected sequence of events will result in a future connectivity issue exceeding a threshold; and
      on a condition that the anomaly satisfies the criterion for triggering the packet capture operation, cause at least one of the first network device or the second network device to capture at least one target packet.

10. The device of claim 9, wherein the non-transitory memory includes further processor-readable instructions that, when executed by the processor, cause the device to take a remedial action affecting the connectivity process based on the at least one target packet.

11. The device of claim 9, wherein at least one event in the detected sequence of events comprises at least one of an association event, an authorization event, a mobility event, a dynamic host configuration protocol (DHCP) event, or a running event.

12. The device of claim 9, wherein determining that the anomaly satisfies the criterion for triggering the packet capture operation comprises determining that the detected sequence of events conforms to at least one acceptable template sequence of a plurality of acceptable template sequences.

13. The device of claim 9, wherein the anomaly satisfies the criterion for triggering the packet capture operation if the detected sequence of events comprises a number of events of a same type that exceeds the threshold.

14. The device of claim 9, wherein the anomaly satisfies the criterion for triggering the packet capture operation if the detected sequence of events comprises at least one event exceeding a threshold duration.

15. The device of claim 9, wherein the anomaly satisfies the criterion for triggering the packet capture operation if the detected sequence of events exceeds a threshold cumulative duration.

16. The device of claim 9, wherein determining that the anomaly satisfies the criterion for triggering the packet capture operation comprises receiving time stamp information.

17. A non-transitory computer readable storage medium storing instructions, that, when executed by a computing device cause the computing device to perform a method comprising:
   detecting an anomaly in a detected sequence of events occurring during a connectivity process for establishing a connection between a first network device and a second network device of a plurality of network devices, wherein each successive event expected to occur in a specific sequence during the connectivity process is assigned a successive sequence number comprising a positive integer, and wherein determining the anomaly comprises:
      determining a set of positive integers assigned to the detected sequence of events occurring during the connectivity process, and
      determining a difference between the set of positive integers assigned to the detected sequence of events and an expected set of positive integers assigned to a predetermined sequence of events;
   determining that the anomaly satisfies a criterion for triggering a packet capture operation, wherein the criterion comprises a probability that the detected sequence of events will result in a future connectivity issue exceeding a threshold; and
   in response to determining that the anomaly satisfies the criterion for triggering the packet capture operation, causing at least one of the first network device or the second network device to capture at least one target packet.

18. The non-transitory computer readable storage medium of claim 17, wherein at least one event in the detected sequence of events comprises at least one of the following: an association event, an authorization event, a mobility event, a dynamic host configuration protocol (DHCP) event, and a running event.

19. The non-transitory computer readable storage medium of claim 17, wherein determining that the anomaly satisfies the criterion for triggering the packet capture operation comprises determining that the detected sequence of events conforms to at least one acceptable template sequence of a plurality of acceptable template sequences.

20. The non-transitory computer readable storage medium of claim 17, wherein determining that the anomaly satisfies the criterion for triggering the packet capture operation comprises receiving time stamp information.

* * * * *